(12) United States Patent
Hong et al.

(10) Patent No.: US 10,938,973 B2
(45) Date of Patent: *Mar. 2, 2021

(54) METHOD AND SYSTEM FOR SEARCHING FOR OBJECT IN NETWORK

(71) Applicant: SAMSUNG ELECTRONICS CO., LTD., Suwon-si (KR)

(72) Inventors: Jung-kih Hong, Seoul (KR); Min-suk Choi, Gumi-si (KR); Seong-hoon Kang, Suwon-si (KR); Yoon-suk Choi, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,761

(22) Filed: Dec. 30, 2019

(65) Prior Publication Data

US 2020/0137211 A1 Apr. 30, 2020

Related U.S. Application Data

(63) Continuation of application No. 14/560,739, filed on Dec. 4, 2014, now Pat. No. 10,523,804, which is a
(Continued)

(30) Foreign Application Priority Data

Sep. 16, 2011 (KR) .................... 10-2011-0093652

(51) Int. Cl.
*G06F 3/0481* (2013.01)
*H04M 1/725* (2021.01)
(Continued)

(52) U.S. Cl.
CPC ...... *H04M 1/72522* (2013.01); *G06F 3/0486* (2013.01); *G06F 3/0488* (2013.01);
(Continued)

(58) Field of Classification Search
CPC ..... H04M 1/72522; H04L 67/16; H04W 4/21; G06F 16/951; G06F 3/04817; G06F 3/04842; G06F 3/0488; G06F 3/0486
See application file for complete search history.

(56) References Cited

U.S. PATENT DOCUMENTS 5,375,068 A 12/1994 Palmer
5,627,978 A 5/1997 Altom
(Continued)

FOREIGN PATENT DOCUMENTS

CN 1980268 6/2007
CN 101729659 6/2010
(Continued)

OTHER PUBLICATIONS

Office Action dated Jan. 18, 2019 in counterpart Japanese Patent Application No. 2018-036489 and English-language translation.
(Continued)

*Primary Examiner* — Andrey Belousov
(74) *Attorney, Agent, or Firm* — Nixon & Vanderhye, P.C.

(57) ABSTRACT

An example method and a device for providing content to at least one external device are provided. The example method includes communicating with the at least one external device, displaying a plurality of contents stored in the device on a screen of the device, determining whether the at least one external device is executing an application corresponding to an application being executed in the device, and providing at least one of the displayed plurality of contents to the at least one external device, based on the determination.

20 Claims, 11 Drawing Sheets

(a)

(b)

Related U.S. Application Data continuation of application No. 13/595,537, filed on Aug. 27, 2012, now Pat. No. 8,923,828.

(51) Int. Cl.

| | | |
|---|---|---|
| *G06F 3/0484* | (2013.01) | |
| *G06F 3/0488* | (2013.01) | |
| *G06F 3/0486* | (2013.01) | |
| *H04L 29/08* | (2006.01) | |
| *H04W 4/21* | (2018.01) | |
| *G06F 16/951* | (2019.01) | |

(52) U.S. Cl.
CPC ...... *G06F 3/04817* (2013.01); *G06F 3/04842* (2013.01); *G06F 16/951* (2019.01); *H04L 67/16* (2013.01); *H04W 4/21* (2018.02)

(56) References Cited

U.S. PATENT DOCUMENTS

| | | |
|---|---|---|
| 6,313,853 B1 | 11/2001 | Lamontagne |
| 6,560,656 B1 | 5/2003 | O'Sullivan et al. |
| 7,039,445 B1 | 5/2006 | Yashizawa |
| 7,339,484 B2 | 3/2008 | Pradhan et al. |
| 7,409,434 B2 | 8/2008 | Lamming et al. |
| 7,668,958 B2 | 2/2010 | Burr |
| 7,778,602 B2 | 8/2010 | Kim |
| 8,041,374 B2 | 10/2011 | Miwa et al. |
| 8,132,100 B2 | 3/2012 | Seo et al. |
| 8,630,681 B2 | 1/2014 | Kim |
| 2002/0183068 A1 | 12/2002 | Dunko et al. |
| 2004/0085947 A1 | 5/2004 | Ekberg et al. |
| 2004/0203381 A1 | 10/2004 | Cahn et al. |
| 2005/0058109 A1 | 3/2005 | Ekberg |
| 2005/0087274 A1 | 4/2005 | Ouyang |
| 2005/0185660 A1 | 8/2005 | Ekberg |
| 2006/0146765 A1 | 7/2006 | Van De Sluis et al. |
| 2006/0242581 A1 | 10/2006 | Manion |
| 2007/0047505 A1 | 3/2007 | Wassingbo |
| 2007/0050472 A1 | 3/2007 | Cha |
| 2008/0140822 A1 | 6/2008 | Torii |
| 2008/0143685 A1 | 6/2008 | Lee et al. |
| 2010/0169473 A1 | 7/2010 | Tsunuzono |
| 2010/0222080 A1 | 9/2010 | Carreras et al. |
| 2010/0257251 A1 | 10/2010 | Mooring et al. |
| 2011/0081923 A1 | 4/2011 | Forutanpour |
| 2011/0083111 A1 | 4/2011 | Forutanpour |
| 2011/0113085 A1 | 5/2011 | Manor et al. |
| 2011/0128946 A1 | 6/2011 | Saito et al. |
| 2011/0213876 A1 | 9/2011 | Kumar et al. |
| 2012/0011247 A1 | 1/2012 | Mallik et al. |
| 2012/0047276 A1 | 2/2012 | Lindquist et al. |
| 2012/0297078 A1 | 11/2012 | Hong et al. |
| 2013/0013779 A1 | 1/2013 | McGuire et al. |
| 2013/0229944 A1 | 9/2013 | Montemurro et al. |
| 2014/0012915 A1 | 1/2014 | Shen |

FOREIGN PATENT DOCUMENTS

| | | |
|---|---|---|
| EP | 1 638 292 | 3/2006 |
| JP | 09-23414 | 1/1997 |
| JP | 2001-144781 | 5/2001 |
| JP | 2003-196076 | 7/2003 |
| JP | 2006-020345 | 1/2006 |
| JP | 2007-067724 | 3/2007 |
| JP | 2007-272340 | 10/2007 |
| JP | 2010-026780 | 2/2010 |
| KR | 10-2011-0038842 | 4/2011 |
| WO | 2005/076134 | 8/2005 |
| WO | 2011/059978 | 5/2011 |

OTHER PUBLICATIONS

Notice of Non-Final Rejection dated Apr. 19, 2018 in counterpart Korean Patent Application No. 10-2011-0093652 and English-language translation.
Japanese Office Action dated Jul. 4, 2017 issued in counterpart Application No. 2014-530582, 6 pages.
European Search Report dated Jan. 25, 2017 issued in counterpart Application No. 16197371.4-1870, 8 pages.
Chinese Office Action dated Jul. 4, 2016 issued in counterpart Application No. 201280056464.3, 14 pages.
Japanese Office Action dated Aug. 9, 2016 issued in counterpart Application No. 2014-530582, 6 pages.
European Search Report dated Apr. 7, 2015 issued in counterpart Application No. 12832080.1-1870.
First Office Action dated Mar. 27, 2020 in counterpart Chinese Patent Application No. 201711208685.9 and English-language machine translation.

FIG. 8
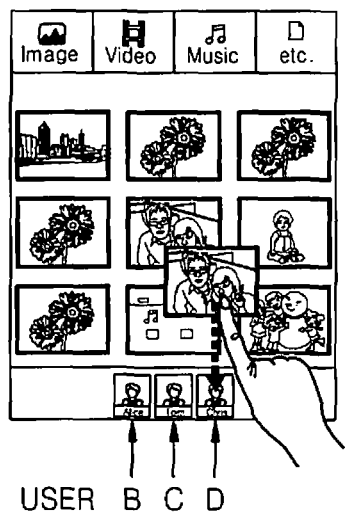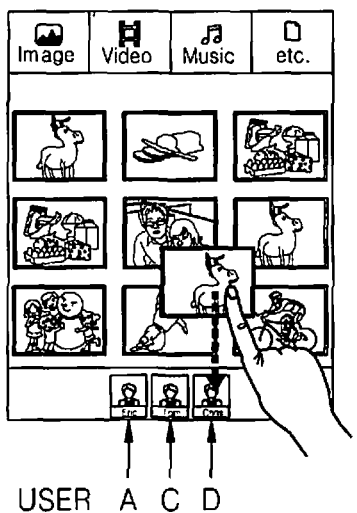
(a) USER A (Eric) — USER B C D
(b) USER B (Alice) — USER A C D
FIG. 9
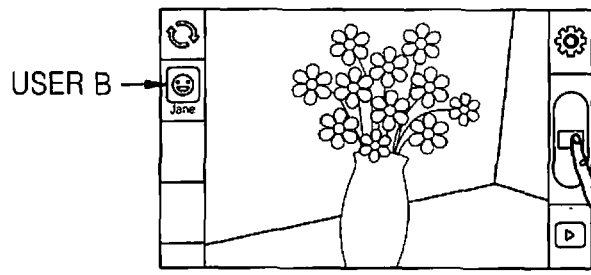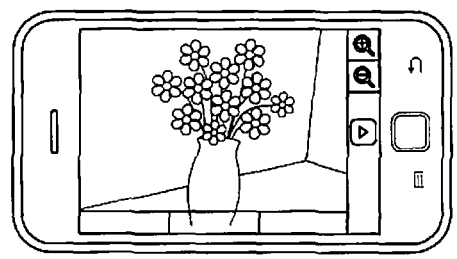
(a) USER A
(b) USER B (Jane)

METHOD AND SYSTEM FOR SEARCHING FOR OBJECT IN NETWORK

PRIORITY

This application is a continuation of U.S. patent application Ser. No. 14/560,739, filed on Dec. 4, 2014, now U.S. Pat. No. 10,523,804, which is a continuation of U.S. patent application Ser. No. 13/595,537, filed on Aug. 27, 2012, now U.S. Pat. No. 8,923,828, which claims priority under 35 U.S.C. § 119(a) to Korean Patent Application No. 10-2011-0093652, filed on Sep. 16, 2011, in the Korean Intellectual Property Office. The entire disclosures of each of these application are incorporated by reference herein in their entirety.

BACKGROUND

1. Field of the Invention

The present invention relates generally to methods and systems for searching for an object in a network, and more particularly, to an object searching method and system for searching for objects in a network and providing a service between the objects.

2. Description of the Related Art

A process of performing a service between devices in a network is somewhat complex. That is, a host device is selected, and a user of the host device inputs a scan command to the host device to search for neighboring devices and then search for and select a device acting as a guest device from among the searched for devices. Thus, it is inconvenient to individually search for and select a host device and guest devices from among devices that are a part of a network. Accordingly, there is a need to develop a method of more conveniently providing a service to various devices.

FIG. 1 is a diagram illustrating a conventional network consisting of a plurality of devices. The plurality of devices in the network are divided into a plurality of network groups, e.g., network groups A to C. A device acting as a host device is then selected from among each of the network groups A to C. A user then searches for the other devices from among each of the network groups A to C by inputting a scan command to each host device and then selects devices acting as guests from among the searched for devices.

FIG. 2 is a flowchart illustrating a method of performing a service between devices in a network. First, in step S201, a network group in which the service is to be performed is set or selected. For example, a network group is selected from network groups A to C of FIG. 1. In step S203, a link command "ON" is transmitted to a user device. In step S205, it is determined whether there is a neighboring device that belongs to the set/selected network group and to which the link command "ON" is transmitted. In step S207, if it is determined in step S205 that such a neighboring device is not present, then the user device joins the set/selected network group as a host device. In step S209, it is determined whether there is another neighboring device that belongs to the set/selected network group and to which the link command "ON" is transmitted. In step S211, if it is determined in step S209 that such a neighboring device is present, then the neighboring device is allowed to join the set/selected network group as a guest. In step S213, the service is performed. In step S215, if it is determined in step S205 that such a neighboring device is present, the user device joins the set/selected network group as a guest. In step S213, the service is performed.

According to this method, information regarding objects to which a service is to be provided or that are to be accessed should first be recognized by a host device and some of this information should be stored. During the performance of a service, a mode of a device, i.e., whether the device is a host or a guest, should be determined and a waiting mode should be entered to receive an additional service.

Furthermore, it is difficult to effectively provide a service to devices in various networks and to effectively search for the location of each device in different networks. Accordingly, it is inconvenient to provide a service and check a result of providing the service.

Korean Patent Publication No. 2011-0038842, entitled "System and Method for Connecting Network-based Host Device," discloses technology related to a network connecting system.

However, the above does not teach a method of effectively searching for devices in various networks and detecting the location of each of the searched for devices, which would make providing a service more convenient.

SUMMARY

The present invention has been made to address at least the problems and disadvantages described above, and to provide at least the advantages described below.

Accordingly, an aspect of the present invention is to provide a method for efficiently searching for objects in a network and displaying a list of the objects on a screen.

Another aspect of the present invention is to provide a method for searching for objects in a network, in which an interactive event is performed between the objects, independently from the states of the objects.

In accordance with an aspect of the present invention, a method of a device for providing content to at least one external device is provided. The method includes communicating with the at least one external device, displaying a plurality of contents stored in the device on a screen of the device, determining whether the at least one external device is executing an application corresponding to an application being executed in the device, and providing at least one of the displayed plurality of contents to the at least one external device, based on the determination.

In accordance with another aspect of the present invention, a device for providing content to at least one external device is provided. The device includes a communication unit configured to communicate with the at least one external device, a display unit configured to display a plurality of contents stored in the device, and a controller configured to determine whether the at least one external device is executing an application corresponding to an application being executed in the device, and provide at least one of the displayed plurality of contents to the at least one external device, based on the determination.

In accordance with another aspect of the present invention, a non-transitory computer readable recording medium having recorded thereon a computer program for executing a method is provided. The method includes communicating with the at least one external device, displaying a plurality of contents stored in the device on a screen of the device, determining whether the at least one external device is executing an application corresponding to an application being executed in the device, and providing at least one of the displayed plurality of contents to the at least one external device, based on the determination.

BRIEF DESCRIPTION OF THE DRAWINGS

The above and other aspects, features and advantages of the present invention will become more apparent by describing in detail embodiments thereof with reference to the attached drawings in which:

FIG. 8 is a diagram illustrating a service between a plurality of devices in a network, according to an embodiment of the present invention;

FIG. 9 is a diagram illustrating a service between devices connected to one another, according to an embodiment of the present invention;

DETAILED DESCRIPTION OF EMBODIMENTS OF THE PRESENT INVENTION

Figure 1:
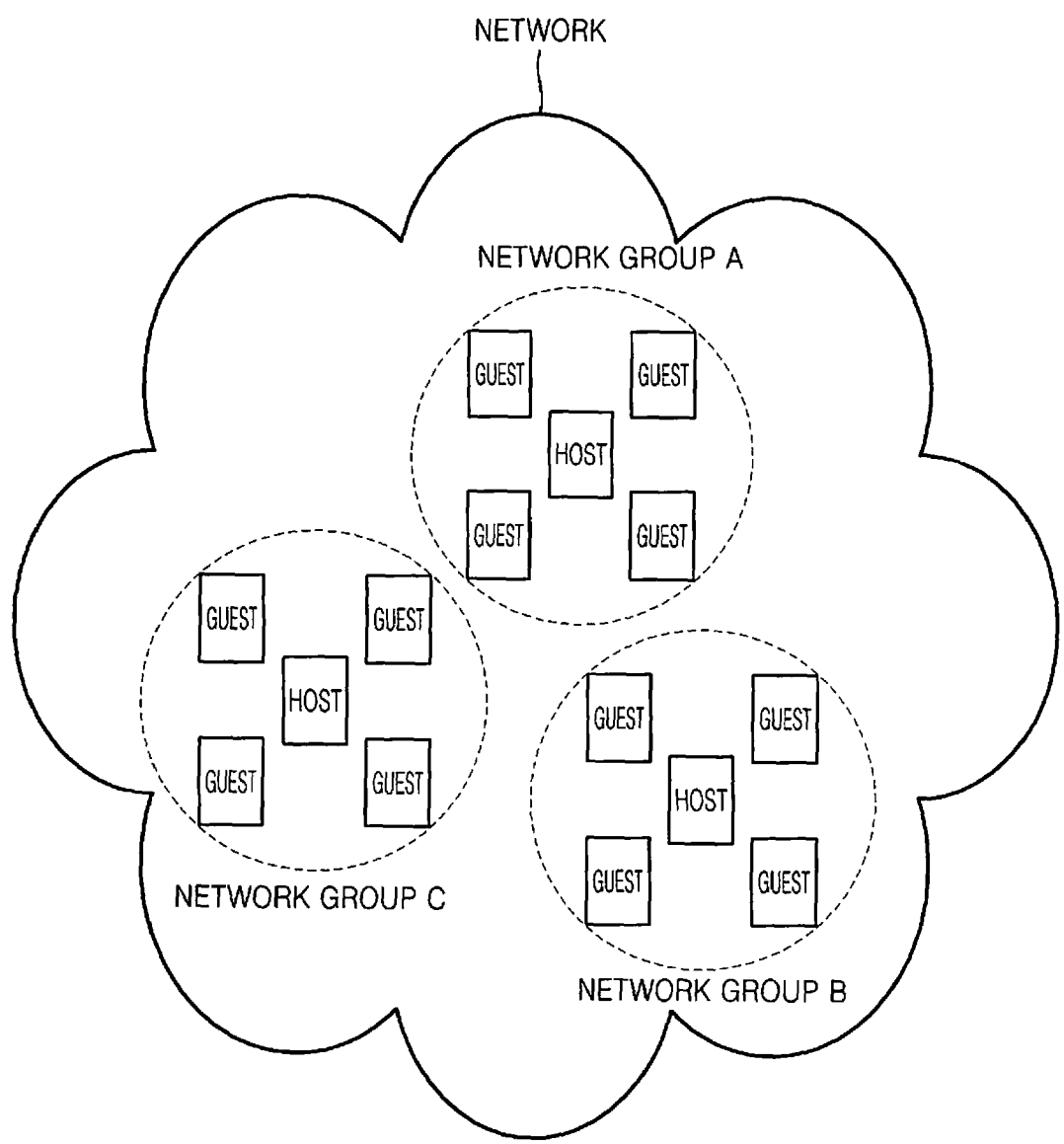
FIG. 1 is a diagram illustrating a network consisting of a plurality of devices.
Figure 2:
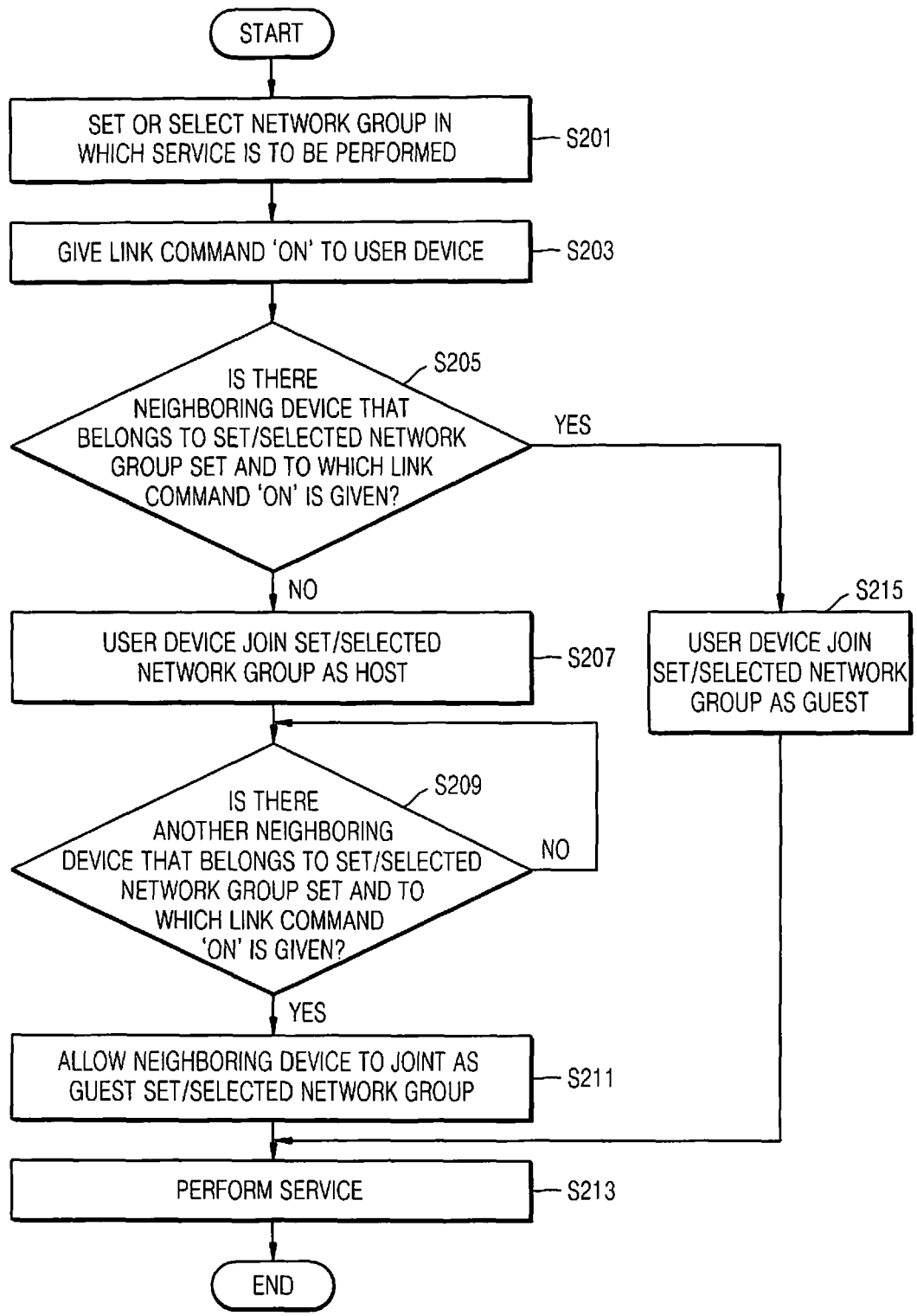
FIG. 2 is a flowchart illustrating a method of performing a service between devices in a network.

Hereinafter, embodiments of the present invention will be described with reference to the accompanying drawings. Throughout the drawings, the same elements will be designated by the same reference numerals.

Throughout the present specification, it will be understood that when an element, such as a layer, a region, or a substrate, is referred to as being "connected to" or "coupled to" another element, it may be directly connected or coupled to the other element or may be electrically connected or coupled to the other element via another element.

Also, the term 'service' means a service provided between devices, and may include at least one from among, for example, an information search service for searching for information regarding a target device, a file transmission service, a content streaming service, a content printing service, a file sharing service, and a remote control service.

In the present specification, a terminal that provides a service and searches for an object is referred to as a "first device" and a terminal that receives a service and is detected by the first device is referred to as a "second device."

However, the present invention is not limited thereto, and the second device searches for the first device and provide a service to the first device.

Figure 3:
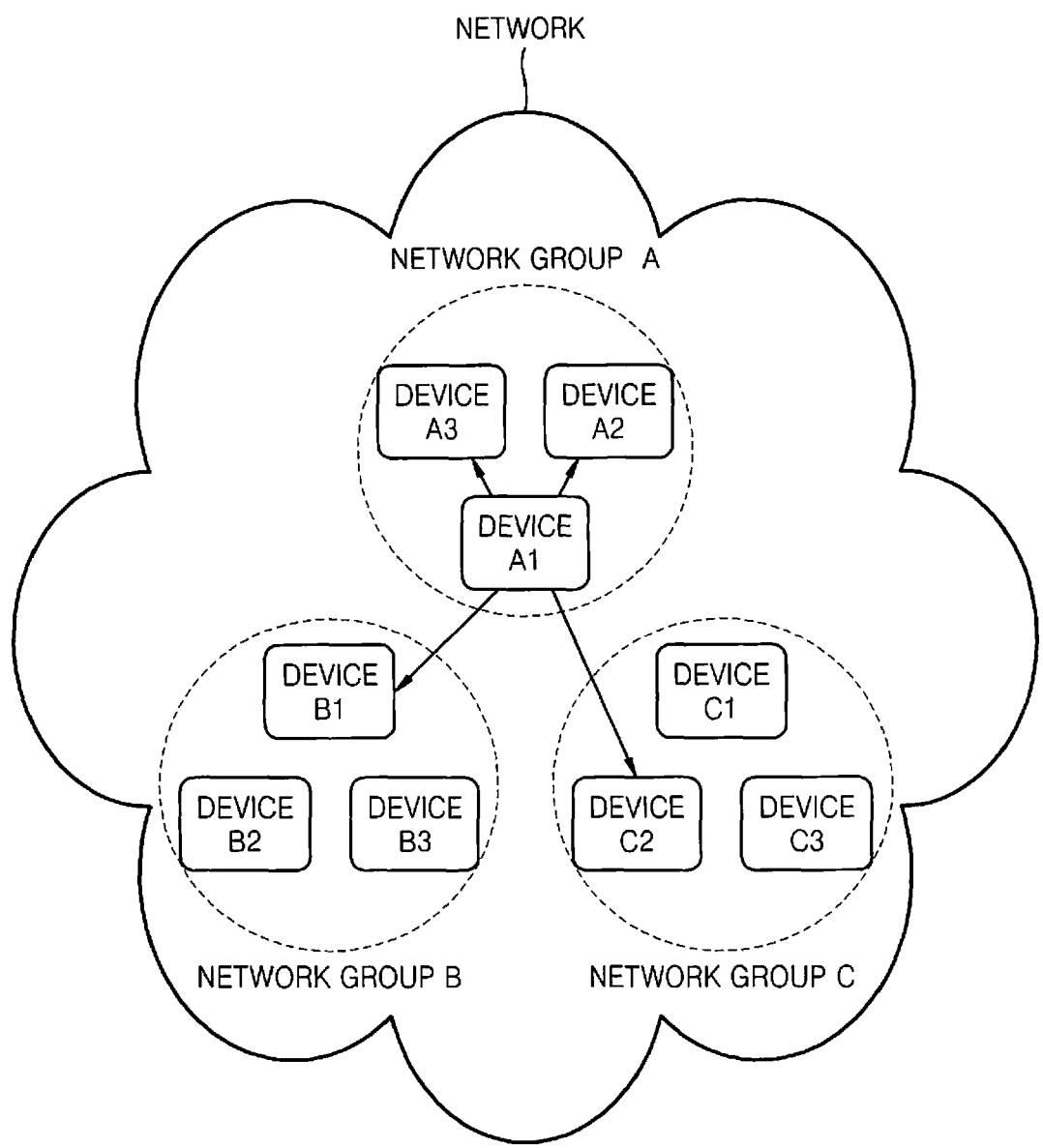
FIG. 3 is a diagram illustrating a plurality of devices participating in a network, according to an embodiment of the present invention.

FIG. 3 is a diagram illustrating a plurality of devices participating in a network, according to an embodiment of the present invention. Referring to FIG. 3, a plurality of devices, namely A1, A2, A3, B1, B2, B3, C1, C2, and C3, are included in different networks, e.g., a network group A, a network group B, and a network group C.

The device A1 belongs to the network group A provides a service, and detects either a device to which a service is to be provided or an object included in such a device. The object is software or an application included in the device and is installed in the device to provide a service. The device A1 searches for a device, in which an object corresponding to an object included in the device A1 to provide a service is being performed. For example, if an application A is included in the device A1 and the device A1 will provide a service to other devices by using the application A, then the device A1 searches for devices A2, A3, B1, and C2 in which the application A is being performed. The device A1 is a first device, and the devices A2, A3, B1, and C2 is second devices.

The device A1 searches for devices in various networks or an object included in a device, based on various communication methods. For example, the device A1 searches for the device B1 in the network group B and the device C2 in the network group C. The search is performed according to any of various communication methods, based on whether object searching is to be performed in the same network or whether a search target is defined.

The device A1 receives terminal information and location information from searched for devices (or objects), and create a list of searched for devices to reflect the terminal information and location information.

Examples of a device according to an embodiment of the present invention are various types of terminals capable of exchanging data with another terminal via a network, e.g., a TeleVision (TV) including an Internet Protocol (IP) Set-Top box (STB) therein, a smart TV, a computer, a notebook computer, or a personal portable terminal.

A method of searching for an object in a network and providing a service according to an embodiment of the present invention will now be described with reference to FIG. 4.

Figure 4:
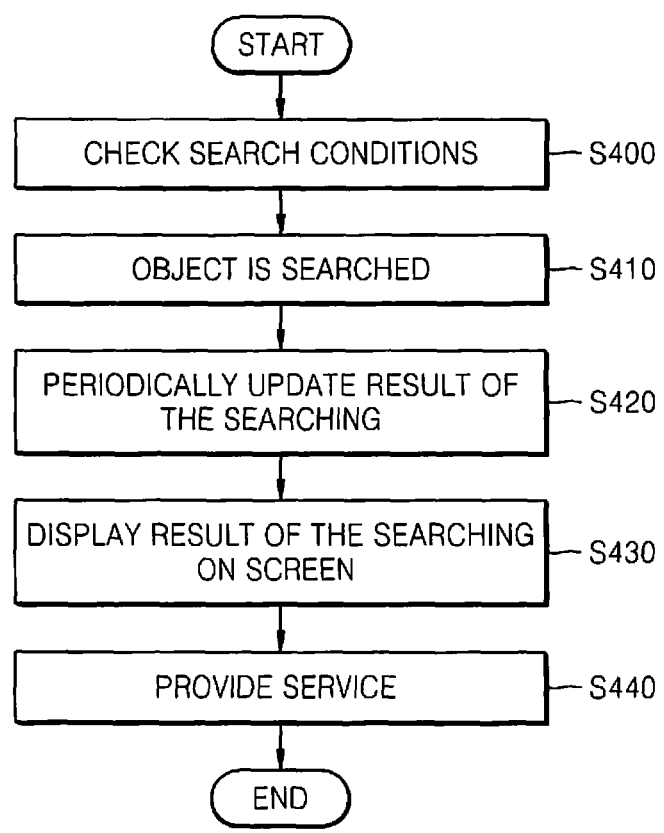
FIG. 4 is a flowchart illustrating a method of searching for an object in a network and providing a service, performed by a first device, according to an embodiment of the present invention.

FIG. 4 is a flowchart illustrating a method of searching for an object in a network and providing a service, performed by a first device, according to an embodiment of the present invention. In step S400, the search conditions are checked. Specifically, in step S400, a first device checks object search conditions to search for neighboring objects. The object search conditions are conditions regarding a communication method used to search for an object. For example, the object search conditions are set and stored in a configuration file in the first device but is not limited thereto. Alternatively, the object search conditions are stored in an external server (not shown), and the first device receives the object search conditions from the external server.

The object search conditions are set in a manner such that different communication methods are used based on whether object searching is to be performed in the same network and whether a search target is defined. For example, if the first device that is a detecting device and a second device that is a search target are both present in the same network and a search target is not defined, then the object search conditions are set in a manner such that the first device searches the second device for an object, based on broadcasting or multicasting.

If the first device that is a detecting device and the second device that is a search target are present in the same network and a search target is defined, then the object search conditions are set in a manner such that the first device searches for an object, based on unicasting. In this case, User Datagram Protocol (UDP) unicasting is used.

If the first device that is a detecting device and the second device that is a search target are present in different networks, the object search conditions are set in a manner such that the first device searches for an object, based on broadcasting and UDP unicasting.

In step S410, an object is searched for. Specifically, in step S410, the first device searches for an object based on the object search conditions. If the first device searches for an object in a network to which the first device belongs, then the first device may, for example, broadcast a communication as to whether a particular object is installed in a second device in the network, via an Access Point (AP) of the network. If the first device searches for an object in a different network, the first device may, for example, broadcast a communication as to whether a particular object is installed in a second device which is a search target, via an AP of a network to which the second device belongs. Moreover, the first device may communicate with a second device as to whether a particular object is installed in a second device in a different network, according to UDP unicasting.

Also, in step S410, the first device searches for whether an object corresponding to an object installed in the first device to provide a service is installed in the second device. Here, the corresponding object is the same as or compatible with the object in the first device to provide a service.

Furthermore, in step S410, the first device provides the second device with an identifier of an object that is being performed in the first device itself to provide a service. Otherwise, the first device provides the second device with identifiers of objects that are compatible with the object that is being performed in the first device itself to provide a service.

In step S420, a result of the searching is periodically updated. In step S420, the first device may periodically check whether a searched for object is activated. In step S420, the first device may communicate with the second device that is a search target regarding whether an object installed in the second device is activated, and may update the result of the searching, based on the response to the communication, received from the second device. Further, the first device may register or cancel registration of the object installed in the second device, and provide a service to the object that is registered and activated.

In step S430, the result of the search is displayed on a screen. In step S430, the first device receives terminal information and location information from the second device, and creates and displays a list of searched for devices to reflect the terminal information and location information. The second device creates the location information thereof, for example, by detecting its own location by using a Global Positioning System (GPS) or by performing trigonometry based on signal intensity operation.

The list of searched for devices may include identifiers of objects, an identifier of the second device, an identifier of the network to which the second device belongs, and the location information of the second device. The list of searched for devices further includes an AP name of a Wireless Fidelity (WiFi®) network, an application name, the name of the second device, or a user identifier or location value of the second device.

The list of searched for devices is displayed in a pop-up window on a screen of the first device.

In step S440, a service is provided to a searched for object. In step S440, an object in the first device is connected to a searched object in the second device, and a service is provided from the first device to the second device via the connected objects. The service provided from the first device to the second device includes at least one from among, for example, an information search service for searching for information regarding a target device, a file transmission service, a content streaming service, a content printing service, a file sharing service, and a remote control service.

In step S420, the updating of the result of the search is performed while operations S430 and S440 are performed, and is repeatedly performed in a predetermined cycle. The predetermined cycle is differently set for each device.

Figure 5:
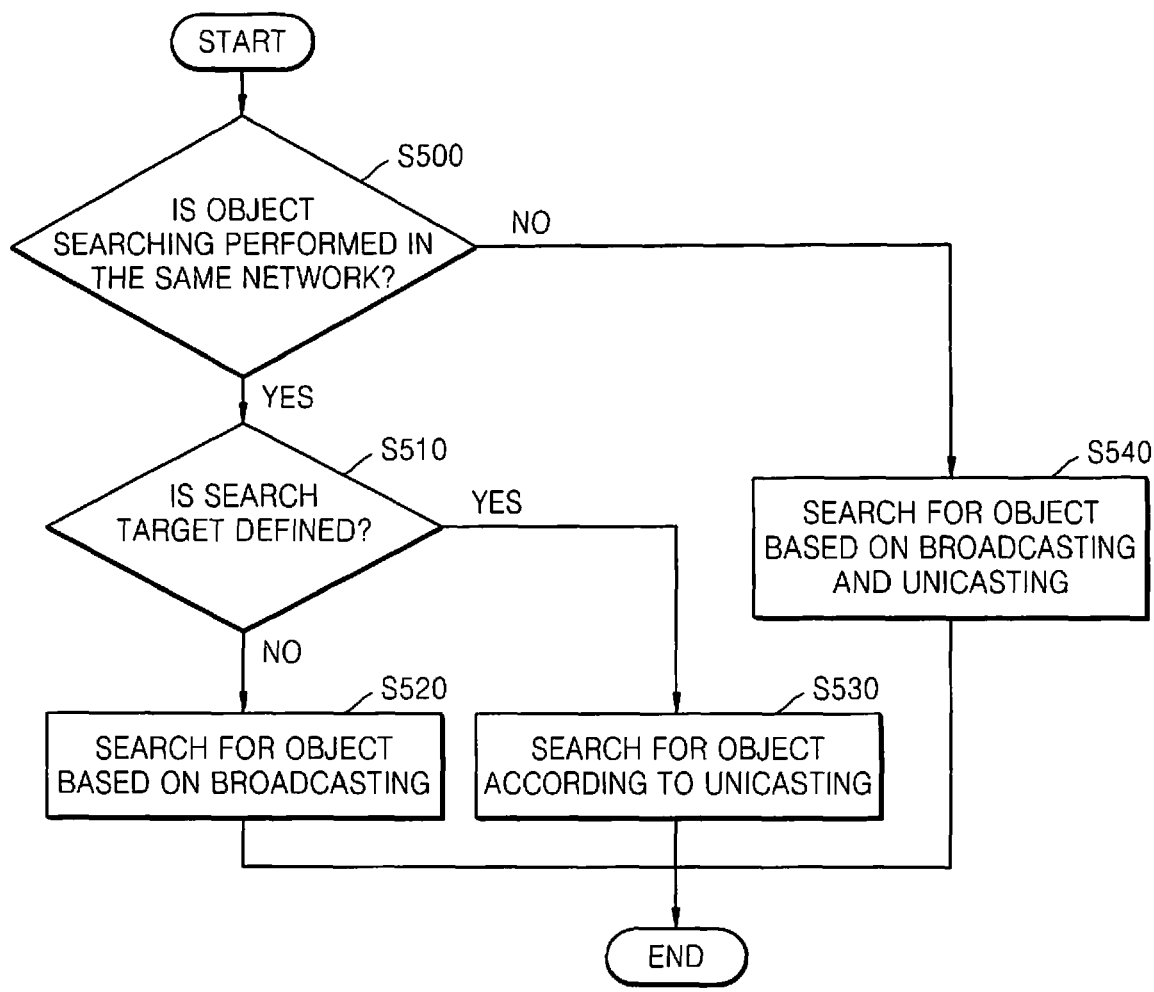
FIG. 5 is a flowchart illustrating a method of searching for an object, performed by a first device, according to an embodiment of the present invention.

FIG. 5 is a flowchart illustrating a method of searching for an object, performed by a first device, according to an embodiment of the present invention. In step S500, it is determined whether object searching is to be performed in the same network. In step S500, the first device determines whether an object included in a second device in a network to which the first device itself belongs is to be searched for. Also, in step S500, upon receiving a user input instructing to perform object searching, the first device determines whether an object in the network to which the first device itself belongs is to be searched for, based on the user input, but the present invention is not limited thereto.

If it is determined in step S500 that object searching is to be performed in the same network, then step S510 is performed.

In step S510, it is determined whether a search target is defined. In step S510, the first device determines whether an object in a particular device or an object in an arbitrary device is to be searched for. Also in step S510, upon receiving a user input instructing to perform object searching, the first device determines whether an object in a particular device is to be searched for based on the user input, but the present invention is not limited thereto.

In step S520, if it is determined in step S510 that a search target is not defined, then an object is searched for according to broadcasting in step S520, the first device searches for an object by communicating with a plurality of devices about whether a particular object is installed therein, according to broadcasting and receiving a reply from a device in which the particular object is installed.

In step S530, if it is determined in step S510 that a search target is defined, then an object is searched for according to unicasting. In step S530, the first device searches for an object by communicating with a particular device about whether a particular object is installed therein, according to unicasting, and receiving a reply from the particular device.

In step S540, if it is determined in step S500 that object searching should not be performed in the same network, then the first device searches for an object based on broadcasting and unicasting. In step S540, the first device searches for an object by communicating with a particular device about whether a particular object is installed therein, according to broadcasting and unicasting, and receiving a reply from the particular device.

In the method illustrated in FIG. 5, at least one of broadcasting and unicasting is used based on whether object searching is to be performed in the same network and whether a search target is defined.

Figure 6:
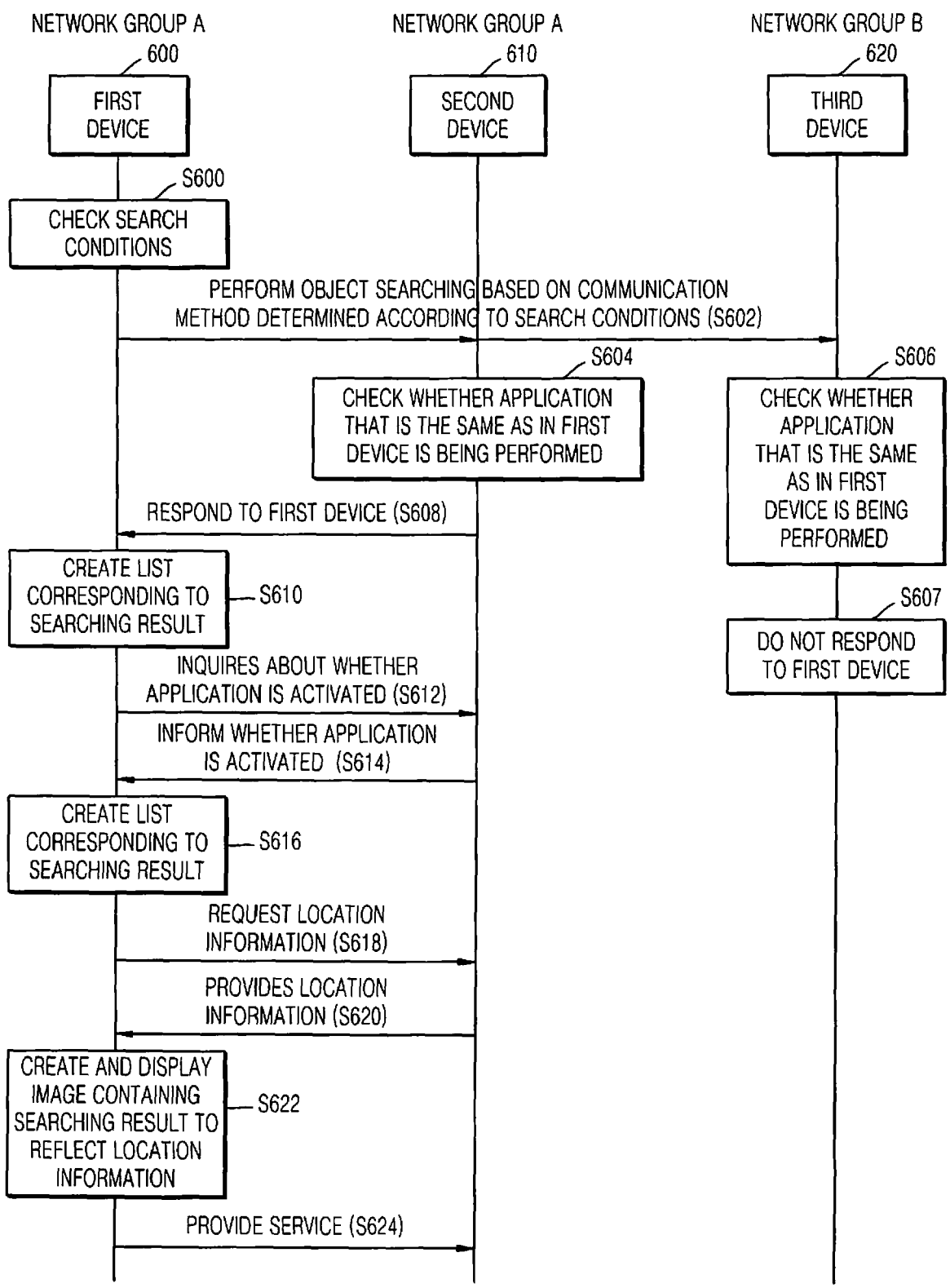
FIG. 6 is a flowchart illustrating a method of searching for objects and providing a service between devices in a network, according to an embodiment of the present invention.

FIG. 6 is a flowchart illustrating a method of searching for objects and providing a service between devices in a network, according to an embodiment of the present invention. In FIG. 6, a first device 600 is a detecting device and a second device 610 and a third device 620 are search targets. In other words, in FIG. 6, the first device 600 in a network A provides a service, and the second and third devices 610 and 620 that are search targets is respectively included in the network A and a network B.

In step S600, the first device 600 checks search conditions. In step S600, the first device 600 checks object search conditions to search for neighboring objects. The object search conditions is preset and stored in, for example, a configuration file in the first device 600. Alternatively, the object search conditions are stored in an external server (not shown), and the first device 600 receives the object search conditions from the external server. The object search conditions are set in a manner such that different communication methods are used based on whether object searching should be performed in the same network and whether a search target is defined.

In step S602, the first device 600 searches for an object based on a communication method determined according to the search conditions. In step S602, the first device 600 may communicate with the second device 610 and the third device 620 about whether a particular object is included therein, based on whether object searching should be performed in the same network and whether a search target is defined. Moreover, in step S602, the first device 600 provides the second device 610 and the third device 620 with an identifier of an object that is being performed in the first device 600 to provide a service.

Further, in step S602, if a search target is not defined since both the first device 600 and the second device 610 are present in the network A, then the first device 600 communicates with the second device 610 regarding whether a particular object is included therein, according to broadcasting or multicasting. If a search target is defined, the first device 600 communicates with the second device 610 regarding whether a particular object is being performed therein, according to unicasting.

Also, in step S602, since the first device 600 is a part of network A and the third device 620 is a part of network B, the first device 600 communicates with the third device 620 regarding whether a particular object is being performed therein, according to broadcasting and unicasting.

In step S604, the second device 610 checks whether an application that is the same as an application that is being executed in the first device 600 is being performed in the second device 610 itself. In step S604, the second device 610 checks whether a particular object, e.g., an application, is being executed in the second device 610 itself, based on an object identifier received from the first device 600.

In step S608, if it is determined in step S604 that the same application is being executed in the second device 610, then the second device 610 informs the first device 600 of this fact. In step S608, the second device 610 provides the first device 600 with a device identifier or an identifier of a device user, but the present invention is not limited thereto.

In step S606, the third device 620 checks whether an application that is the same as the application being executed in the first device 600 is being executed in the third device 620 itself. In step S606, the third device 620 checks whether a particular object, e.g., an application, is being executed therein, based on the object identifier received from the first device 600.

In step S607, if it is determined in step S606 that the same application is not being executed, the third device 620 does not respond to the first device 600.

In step S610, the first device 600 creates a list corresponding to a search result. In step S610, the first device 600 creates the list based on the reply from the second device 610, received in step S608. The list may include an identifier of the network A to which the second device 610 belongs, an identifier of the second device 610, and an identifier of a user of the second device 610, and the like.

In step S612, the first device 600 communicates with the second device 610 about whether an application is activated therein. In step S612, the first device 600 provides the second device 610 with an identifier of a particular application, and communicates with the second device 610 about whether the particular application is activated therein. In step S612, the first device 600 communicates with the second device 610 about whether the application is activated therein, in a predetermined cycle. The predetermined cycle is preset based on the types and operating characteristics of the first device 600 and the second device 610. For example, the first device 600 sets the predetermined cycle to be short when the second device 610 is a mobile terminal, and sets the predetermined cycle to be long when the second device 610 is a Personal Computer (PC).

In step S614, the second device 610 informs the first device 600 regarding whether the application is activated therein, in response to the reply from the first device 600. In step S616, the first device 600 updates the list corresponding to the search result. In step S616, the first device 600 may update the list corresponding to the search result, based on a reply being periodically received from the second device 610, and may update the list corresponding to the search result when the second device 610 is registered with the first device 600 or the registration of the second device 610 is canceled.

In step S618, the first device 600 requests the second device 610 to provide location information thereof. In step S620, the second device 610 provides the location information thereof to the first device 600. The location information of the second device is created, for example, by detecting the location thereof by using a GPS signal or by performing trigonometry based on signal intensity.

In step S622, the first device 600 creates an image containing the search result to reflect the location information of the second device 610, and displays the image on a screen thereof. In step S622, the first device 600 creates an image containing the search result, an application identifier, an identifier of the second device 610, an identifier of the network A, which includes the second device 610, and the location information of the second device 610, and displays the image in a pop-up screen on the screen of the first device 600 itself.

In step S624, the first device 600 provides a service to the second device 610. The application in the first device 600 is connected to the application in the second device, and the service is provided from the first device 600 to the second device 610 via the connected applications. Here, the service may include at least one from among, for example, an information search service for searching for information regarding a target device, a file transmission service, a content streaming service, a content printing service, a file sharing service, and a remote control service.

Figure 7:
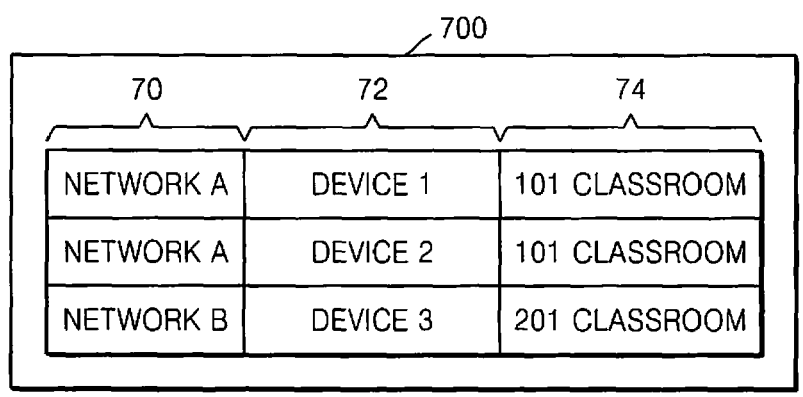
FIG. 7 is a table illustrating a list of searched for devices, according to an embodiment of the present invention.

FIG. 7 is a table illustrating a list of searched for devices, according to an embodiment of the present invention. Referring to FIG. 7, the table is displayed on a screen 700 of a device, and may include a network identifier field 70, a device identifier field 72, and a location information field 74.

In the network identifier field 70, an identifier of a network to which each detected device belongs is recorded. In the device identifier field 72, an identifier of each detected device or an identifier of a user of each detected device is recorded. In the location information field 74, information regarding a location of each detected device is recorded.

Thus, if a service is provided from a first device to a second device, then the first device determines whether a service will be provided to the second device or the type of a service that will be provided to the second device, based on location information of the second device. If a print service is provided from the first device to the second device, a user may easily obtain a result of printing via the second device by checking the location information of the second device.

FIG. 8 is a diagram illustrating a service between a plurality of devices in a network, according to an embodiment of the present invention. Specifically, FIG. 8 illustrates a screen of a device A and a screen of a device B, in which a photo file transmission service is performed between devices A to D when the device A detects the devices B, C, and D and the devices A to D are connected to one another.

Referring to part (a) of FIG. 8, a plurality of photos are displayed on the screen of the device A, and the devices B to D connected to the device A are respectively displayed in lower regions of the screen of the device A. If a user of the device A performs a photo file transmission service from the device A to the device D, then the user may touch and drag one of the plurality of photos displayed on the screen to the lower region of the screen on which the device D, a user of which is Chris, is displayed. The dragging of the photo is an event that starts the photo file transmission service. Physically pressing a button on a device, and touching, dragging, and pasting a text on a screen of the device may also be events that start the photo file transmission service. Furthermore, inputting a speech is an event of starting the photo file transmission service.

Referring to part (b) of FIG. 8, the devices A, C, and D connected to the device B may also be displayed on the screen of the device B detected by the device A. A user of the device B may transmit one of a plurality of photos displayed on the screen to the device D by touching and dragging the photo to a lower region of the screen on which the device D, the user of which is Chris, is displayed.

If both the device A and the device B perform the photo file transmission service to transmit a photo file to the device D, that is, if some of a plurality of devices in the network recognize a predetermined event that starts a service and provide the service to the same device, then the service provided from each of the plurality of devices is independently performed. In other words, each of the devices A and B in the network may independently search for and access the device D and provide the photo file transmission service to the device D.

FIG. 9 is a diagram illustrating a service between devices connected to one another, according to an embodiment of the present invention. Referring to FIG. 9, when a user A presses a shutter release button of a device (a), an image captured by the device (a) is displayed on a screen of a device (b) belonging to a user B.

An icon denoting the user B (Jane) is displayed on a left region of a screen of the device (a). This means that the device (a) of user A and the device (b) of user B recognize each other to perform a service. When the device (a) recognizes an event that starts the service, for example, when the device (a) detects pressing of a shutter release button thereof, then paring is performed between the device (a) and the device (b). After paring is completed, information related to performing the service is set in the device (a) and the device (b). The paring then ends, and the service is then performed between the device (a) and the device (b). Setting a network group for performing the service, checking a host/guest mode during the performing of the service, entering a waiting mode to provide an additional service, and performing a verification process for performing the service is skipped, thereby increasing convenience when providing the service between the device (a) and the device (b).

Figure 10:
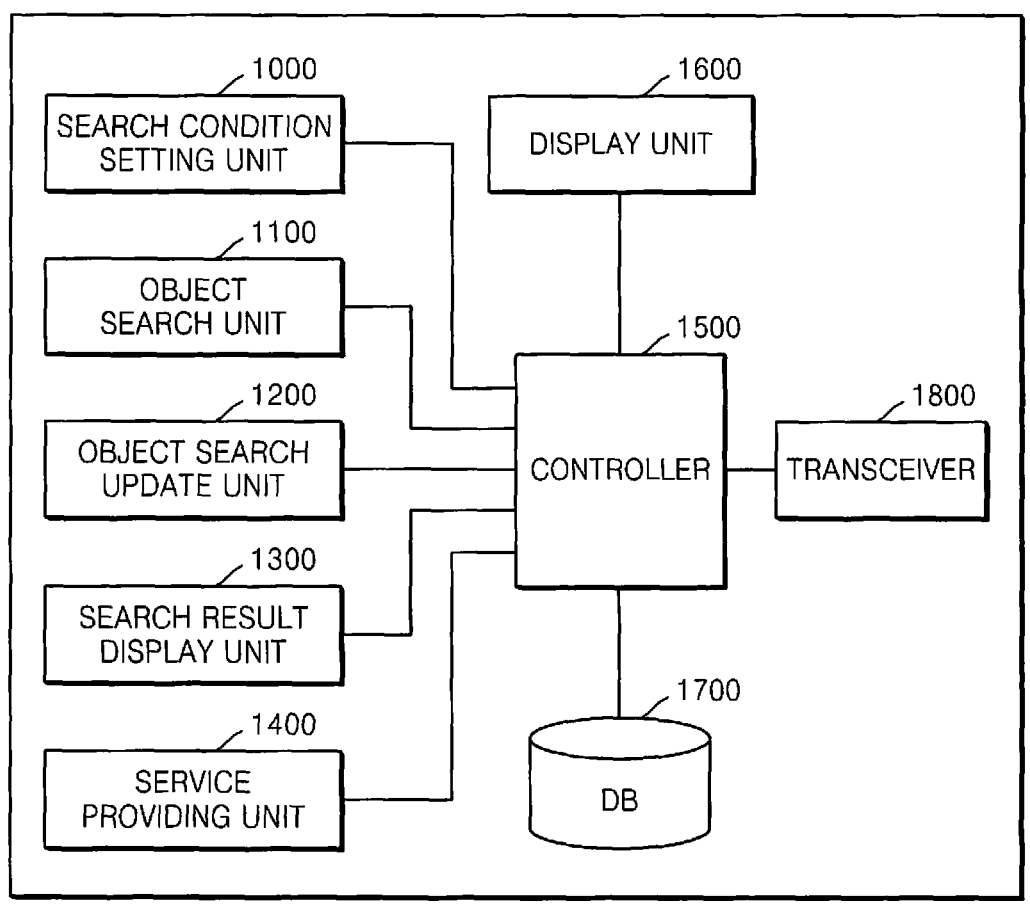
FIG. 10 is a block diagram of a first device according to an embodiment of the present invention.

FIG. 10 is a block diagram illustrating a structure of a first device according to an embodiment of the present invention. Referring to FIG. 10, the first device includes a search condition-setting unit 1000, an object search unit 1100, an object search update unit 1200, a search result display unit 1300, a service-providing unit 1400, a controller 1500, a display unit 1600, a database (DB) 1700, and a transceiver 1800.

The search condition-setting unit 1000 sets object search conditions. The set object search conditions are stored, e.g., in a configuration file included in the DB 1700, or in an external server (not shown).

The search condition-setting unit 1000 sets the object search conditions in a manner such that different communication methods are used to search for an object, based on whether object searching is to be performed in the same network and whether a search target is defined. For example, if the first device that is a detecting device and a second device that is a search target are present in the same network and a target object is not defined, then the condition setting unit 1000 sets the object search conditions in a manner such that the first device searches for an object in the second device based on broadcasting or multicasting.

If the first device and the second device are present in the same network and a target object is defined, then the condition setting unit 1000 sets the object search conditions in a manner such that the first device searches for an object in the second device based on unicasting. In this case, UDP unicasting is used.

If the first device and the second device are present in different networks, then the condition setting unit 1000 sets the object search conditions in a manner such that the first device searches for an object in the second device based on broadcasting and UDP unicasting.

The object search unit 1100 searches for an object according to the object search conditions. If the object search unit 1100 searches for an object in the network to which the first and second devices belong, then the object search unit 1100 may broadcast a communication as to whether a particular object is installed in the second device, for example, via an AP of the network. If the object search unit 1100 searches for an object in a different network to which the first device does not belong, the object search unit 1100 will then broadcast a communication as to whether a particular object is installed in the second device that is a search target, for example, via an AP of the different network to which the second device belongs. The object search unit 1100 searches for whether a particular object is installed in the second device in the different network, according to UDP unicasting.

The object search unit 1100 searches for whether an object corresponding to an object that is installed in the first device to provide a service, is installed in the second device.

Here, the object corresponding to the object in the first device is the same as or compatible with the object in the first device.

The object search unit 1100 provides the second device with an identifier of the object that is being performed in the first device to provide a service. Further, the first device provides the second device with identifiers of objects that are compatible with the object that is being performed in the first device to provide a service. The second device uses the identifier(s) to inform the first device of whether the object is installed or is being performed therein.

The object search update unit 1200 periodically updates a result of searching for an object. The object search update unit 1200 periodically checks whether a searched for object is activated. The object search update unit 1200 periodically communicates with the second device about whether the object is activated therein, receive a reply to the communication from the second device, and then update the result of the searching. Further, the object search update unit 1200 may register or cancel the registration of an object installed in the second device, and provide service to an object that is registered and activated.

Also, the object search update unit 1200 periodically updates the result of the searching while the search result display unit 1300 and the service-providing unit 1400 perform their own operations. A cycle in which the result of the searching is updated is differently set for each device.

The search result display unit 1300 displays the result of the searching on a screen. The search result display unit 1300 receives terminal information and location information from the second device, create a list of searched for devices to reflect the received terminal information and location information, and provide this list to the display unit. The location information of the second device is created by the second device, for example, by detecting the location thereof by using a GPS or performing a trigonometric operation based on signal intensity.

The list of searched for devices includes identifiers of objects, an identifier of the second device, an identifier of the network to which the second device belongs, and the location information of the second device. The list of searched for devices further includes an AP name of a WiFi® network, an application name, the name of the second device or an identifier of a user of the second device, and a location value of the second device, but are not limited thereto. A user may effectively check a result of providing a service between devices by checking location information of the devices included in the list of searched for devices. For example, if a service is provided from the first device to the second device, then a user of the first device determines whether the service has been provided to the second device, based on the location information of the second device. If a print service is provided from the first device to the second device, the user of the first device easily obtains a result of printing from the second device by checking the location information of the second device.

The service-providing unit 1400 provides a service to the second device. The service-providing unit 1400 may connect the first device and the second device, and allow the first device to provide a service to the second device. The service may include at least one from among an information search service for searching for information regarding a target device, a file transmission service, a content streaming service, a content printing service, a file sharing service, and a remote control service.

The controller 1500 controls the search condition-setting unit 1000, the object search unit 1100, the object search update unit 1200, the search result display unit 1300, the service-providing unit 1400, the display unit 1600, the DB 1700, and the transceiver 1800 so as to search for an object corresponding to an object in the first device, display a result of the searching, and provide a service to the second device. Further, the controller 1500 may control overall operations of the first device.

The display unit 1600 displays a created list of searched for devices. The display unit 1600 displays this list in a pop-up window.

The DB 1700 stores various data needed to search for an object corresponding to an object in the first device, display a result of the searching, and provide a service to the second device. The DB 1700 may store the object search conditions, the list of searched for devices, and the like.

The transceiver 1800 transmits and receives the various data needed to search for an object corresponding to an object in the first device, display a result of the searching, and provide a service to the second device.

According to an embodiment of the present invention, the search condition-setting unit 1000, the object search unit 1100, the object search update unit 1200, the search result display unit 1300, the service-providing unit 1400, the controller 1500, the display unit 1600, the DB 1700, and the transceiver 1800 operate as separate units. However, some or all of these elements are operated under the control of one processor.

Also, according to an embodiment of the present invention, operations of the search condition-setting unit 1000, the object search unit 1100, the object search update unit 1200, the search result display unit 1300, the service-providing unit 1400, the controller 1500, the display unit 1600, the DB 1700, and the transceiver 1800 is performed according to a software program installed in the first device.

Figure 11:
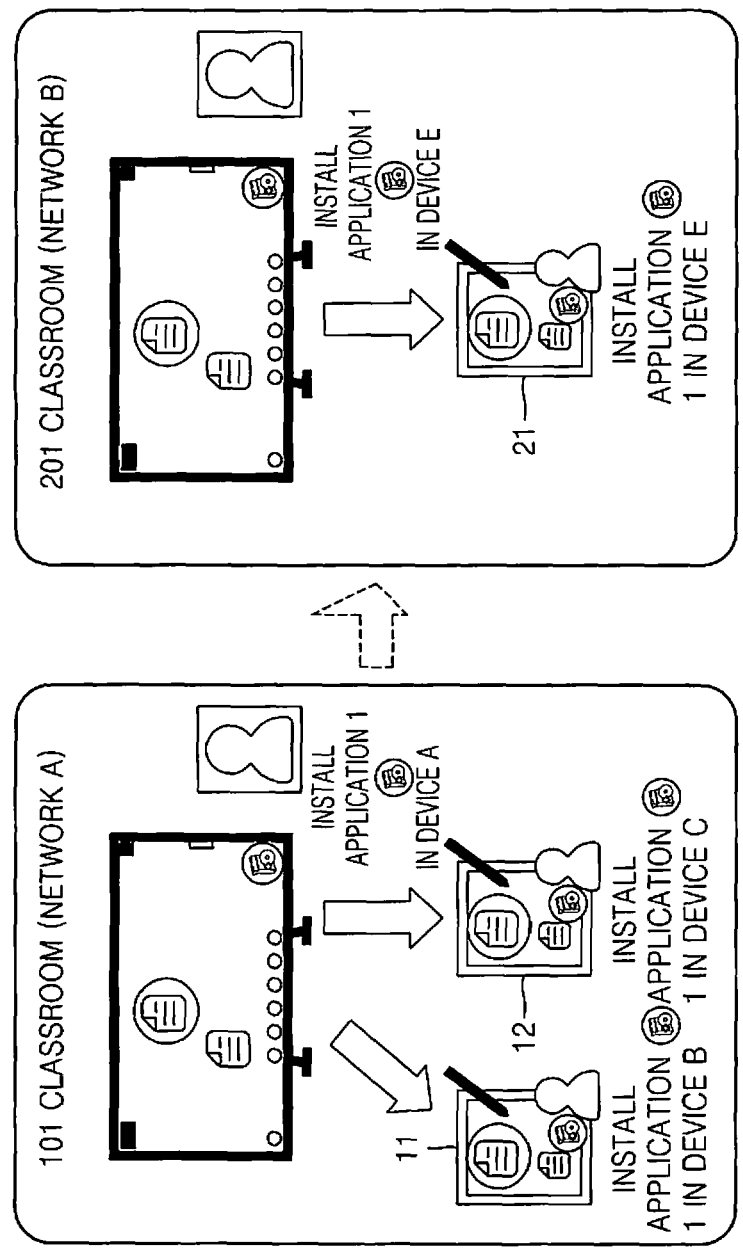
FIG. 11 is a diagram illustrating a method of providing a service by searching a device for objects, performed by another device, according to an embodiment of the present invention.

FIG. 11 is a diagram illustrating a method of providing a service by searching a device for objects, performed by another device, according to an embodiment of the present invention. Referring to FIG. 11, a device A, a device B, and a device C are present in a classroom 101 (network A), and a device E is present in a classroom 201 (network B). The device A searches for an object and provides a service. The device A provides educational information to the other devices. The devices B to E are search targets and receive a service. Referring to FIG. 11, an application 1 is installed in the device A, the device B, the device C, and the device E.

If a search target is not defined, the device A searches for the devices B and C in the network A, in which the application 1 is being performed, according to broadcasting. If a search target is defined, the device A searches for each of the devices B and C in the network A, in which the application 1 is being performed, according to unicasting. The device A uses broadcasting and UDP unicasting to search for the device E in the network B. Thus, the device A may effectively search for devices in various networks.

A list of searched for devices displayed on a screen of the device A further includes location information of the searched for devices B to E. Thus, a user of the device A effectively determines whether a service is to be provided to the devices B to E. Furthermore, the user of the device A easily checks a result of the providing the service by checking the location information.

Figure 12:
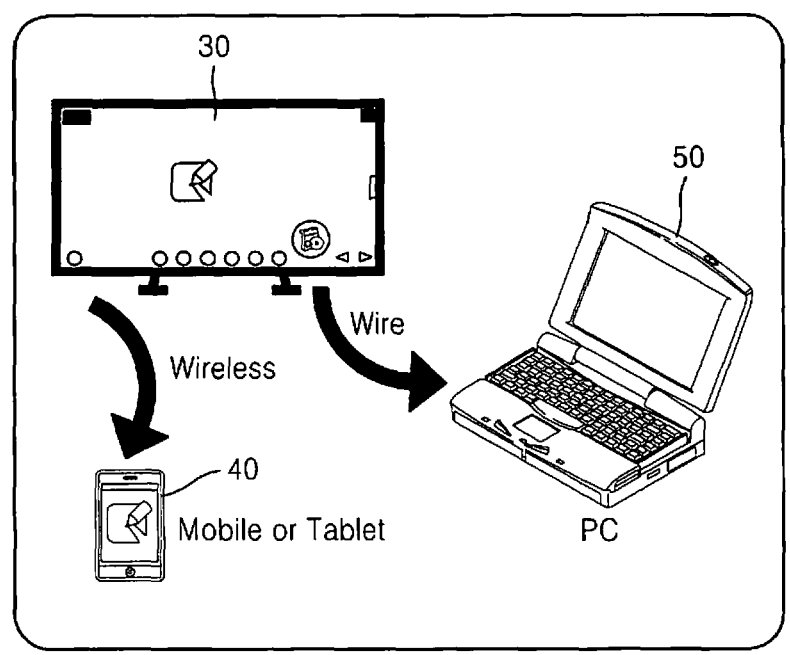
FIG. 12 is a diagram illustrating a method of providing a service from a device to another device, according to an embodiment of the present invention.

FIG. 12 is a diagram illustrating a method of providing a service from a device to another device, according to an embodiment of the present invention. Referring to FIG. 12, a first device searches for a second device and provide a service, in a wireless and a wired network. A device 30 is connected to a device 40 in a wireless manner, is connected to a device 50 via a wire, and provides a service to the device 40 and the device 50.

According to the above embodiments, an object is effectively searched for in a network, and a list of objects containing location information regarding devices is effectively displayed on a screen.

An interactive event may also be performed between objects, independently from the states of the objects.

The one or more embodiments of the present invention may also be embodied as a computer readable recording medium on which commands, e.g., a program module, that is executed by a computer are recorded. The computer readable medium is any of media that is accessed by a computer, e.g., a volatile medium, a non-volatile medium, a detachable medium, and a non-detachable medium. Also, the computer readable medium may be a computer storage medium or a communication medium. Examples of the computer storage medium may include a volatile medium, a non-volatile medium, a detachable medium, and a non-detachable medium that employ a method or technology for storing computer readable commands, data structures, program modules, or other data. In general, examples of the communication medium may store computer readable commands, data structures, program modules, data contained in a modulated data signal, and other transmission mechanisms. The communication medium may be any information transfer media.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. An electronic device comprising:
a memory storing instructions for a program that provides a user interface for browsing images corresponding to image files; and
a processor configured to execute the instructions to at least:
control to display, on a display of the electronic device, one or more images on the user interface;
based on user input received via the display of the electronic device, control to select an image from among the displayed one or more images;
check search conditions to search for one or more external electronic devices;
control to search for one or more external electronic devices of which a program corresponding to the program stored in the electronic device is activated based on a communication method determined according to the search conditions;
based on a search result, control to establish communication, through a first communication method, with a first external electronic device of which the program is activated in the first external electronic device;
based on the search result, control to establish communication, through a second communication method which is different from the first communication method, with a second external electronic device of which the program is activated in the second external electronic device;
control to display, on the display of the electronic device, based on information received from the first and second external electronic devices via the established communications with the first and second external electronic devices, a first representation of the first external electronic device and a second representation of the second external electronic device, while displaying the selected image on the user interface;
based on user input received via the display of the electronic device, control to select an external electronic device from between the first external electronic device and the second external electronic device; and
control to transmit an image file corresponding to the selected image to the selected external electronic device.

2. The electronic device of claim 1, wherein the communication method determined according to the search conditions comprises at least one of broadcasting, unicasting, and multicasting.

3. The electronic device of claim 1, wherein the communication method is determined based on whether the electronic device and the one or more external electronic devices are in a same network.

4. The electronic device of claim 1, wherein the communication method is determined based on whether the one or more external electronic devices are defined.

5. The electronic device of claim 1, wherein the processor is configured to control to search for one or more external electronic devices in a predetermined cycle.

6. The electronic device of claim 1, wherein the selected image is displayed to have a size larger than a size of the first or second representation.

7. The electronic device of claim 1, wherein the respective first and second representations each includes text for identifying the respective external electronic device.

8. The electronic device of claim 1, wherein the first and second representations are displayed side by side.

9. The electronic device of claim 1, wherein the display comprises a touchscreen display.

10. The electronic device of claim 1, wherein the first and second representations comprise respective first and second icons representing the first and second external electronic devices.

11. The electronic device of claim 1, wherein one or the other of the first and second communication methods is WiFi communication.

12. A method performed by an electronic device storing instructions for a program that provides a user interface for browsing images corresponding to image files, the method comprising:
displaying, on a display of the electronic device, one or more images on the user interface;
based on user input received via the display of the electronic device, selecting an image from among the displayed one or more images;
searching for one or more external electronic devices of which a program corresponding to the program stored in the electronic device is activated;
checking search conditions to search for one or more external electronic devices;
controlling to search for one or more external electronic devices of which a program corresponding to the program stored in the electronic device is activated based on a communication method determined according to the search conditions;
based on a search result, establishing communication, through a first communication method, with a first external electronic device of which the program is activated in the first external electronic device;

based on the search result, establishing communication, through a second communication method which is different from the first communication method, with a second external electronic device of which the program is activated in the second external electronic device;

displaying, on a display of the electronic device, based on information received from the first and second external electronic devices via the established communications with the first and second external electronic devices, a first representation of the first external electronic device and a second representation of the second external electronic device, while displaying the selected image on the user interface;

based on user input received via the display of the electronic device, selecting an external electronic device from between the first external electronic device and the second external electronic device; and transmitting an image file corresponding to the selected image to the selected external electronic device.

13. The method of claim 12, wherein the communication method determined according to the search conditions comprises at least one of broadcasting, unicasting, and multicasting.

14. The method of claim 12, wherein the communication method is determined based on whether the electronic device and the one or more external electronic devices are in a same network.

15. The method of claim 12, wherein the communication method is determined based on whether the one or more external electronic devices are defined.

16. The method of claim 12, wherein the controlling to search for one or more external electronic devices comprising controlling to search for one or more external electronic devices in a predetermined cycle.

17. The method of claim 12, wherein the selected image is displayed to have a size larger than a size of the first or second representation.

18. The method of claim 12, wherein the respective first and second representations each includes text for identifying the respective external electronic device.

19. The method of claim 12, wherein the first and second representations are displayed side by side.

20. A non-transitory computer-readable medium having stored thereon instructions for a program that provides a user interface for browsing images corresponding to image files, the program, when executed by a processor of an electronic device, causing the electronic device to perform at least:

displaying, on a display of the electronic device, one or more images on the user interface;

based on user input received via the display of the electronic device, selecting an image from among the displayed one or more images;

checking search conditions to search for one or more external electronic devices;

controlling to search for one or more external electronic devices of which a program corresponding to the program stored in the electronic device is activated based on a communication method determined according to the search conditions;

based on a search result, establishing communication, through a first communication method, with a first external electronic device of which the program is activated in the first external electronic device;

based on the search result, establishing communication, through a second communication method which is different from the first communication method, with a second external electronic device of which the program is activated in the second external electronic device;

displaying, on the display of the electronic device, based on information received from the first and second external electronic devices via the established communications with the first and second external electronic devices, a first representation of the first external electronic device and a second representation of the second external electronic device, while displaying the selected image on the user interface;

based on user input received via the display of the electronic device, selecting an external electronic device from between the first external electronic device and the second external electronic device; and transmitting an image file corresponding to the selected image to the selected external electronic device.

* * * * *